W. B. McCANN.
ICE CREAM FREEZER.
APPLICATION FILED DEC. 10, 1910.

1,013,672.

Patented Jan. 2, 1912.

2 SHEETS—SHEET 1.

Witnesses
Harry W. Mool
Harry D. Semonin

Inventor
William B. McCann,
By Willard Eddy, Attorney

W. B. McCANN.
ICE CREAM FREEZER.
APPLICATION FILED DEC. 10, 1910.

1,013,672.

Patented Jan. 2, 1912.

2 SHEETS—SHEET 2.

Witnesses
Harry W. Mool
Harry D. Semonin

Inventor:
William B. McCann,
By Willard Eddy, Attorney

UNITED STATES PATENT OFFICE.

WILLIAM B. McCANN, OF OMAHA, NEBRASKA.

ICE-CREAM FREEZER.

1,013,672.        Specification of Letters Patent.        Patented Jan. 2, 1912.

Application filed December 10, 1910. Serial No. 596,637.

*To all whom it may concern:*

Be it known that I, WILLIAM B. McCANN, of the city of Omaha, county of Douglas, and State of Nebraska, have invented certain new and useful Improvements in Ice-Cream Freezers, which improvements are described in the following specification and are illustrated by the accompanying drawings.

My invention is a freezer of that kind in which a freezing mixture and a freezable mixture or liquid are placed in contiguous closed compartments of a portable receptacle in the manufacture of ice cream.

The objects of the invention are: to separate the freezing and freezable mixtures in such a freezer, so that neither can be spilled over into the other; to facilitate the proper distribution of the freezing mixture and its ingredients in their appropriate compartment during the operation of charging the freezer therewith; to protect from wear and injury the top and bottom covers of the freezer, standing on end; to insulate the contents of the freezer from the heat of the external air; to stand the freezer on either end at pleasure without injury and without spilling; to invert the freezer, end for end, during the process of freezing, for the purpose of redistributing the freezing mixture or ingredients in their compartment; to detach the frozen cream from the inside walls of the cream chamber by the act of opening that chamber; and in general to produce a superior freezer of the kind which is above specified. To accomplish these objects I incorporate in my improved freezer an external double-walled cylinder and a co-axial internal or cream cylinder, which have mouths or openings at opposite ends respectively, screw caps for said openings, and an internal spring scraper, which is operated by the screw cap of the cream cylinder.

The best manner in which I have contemplated applying the principles of the invention, is shown in said drawings; in which—

Figure 1:
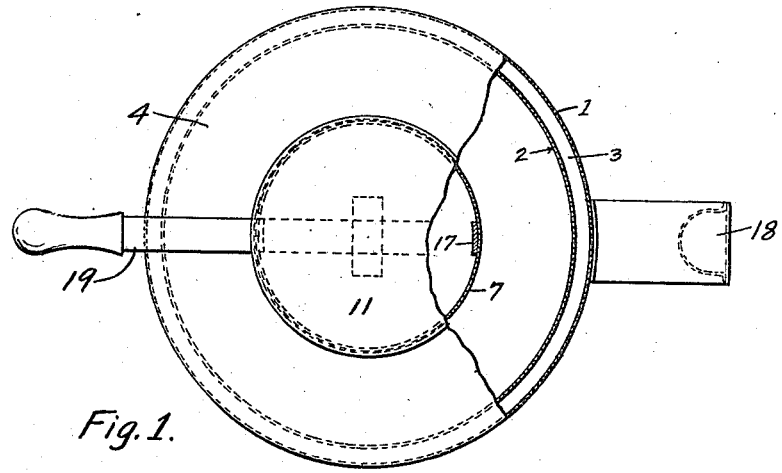
Figure 2:
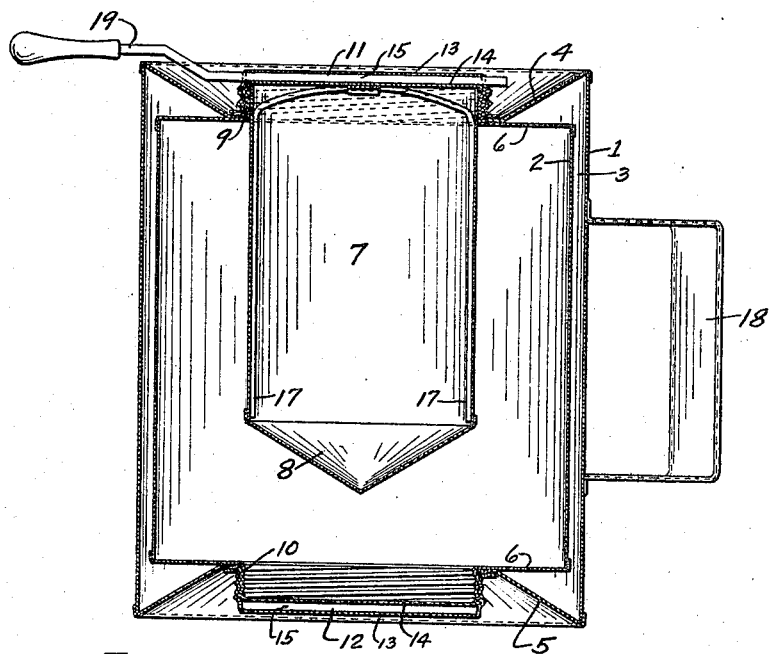
Figure 5:
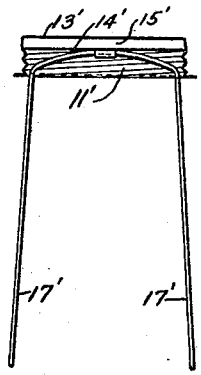
Figure 3:
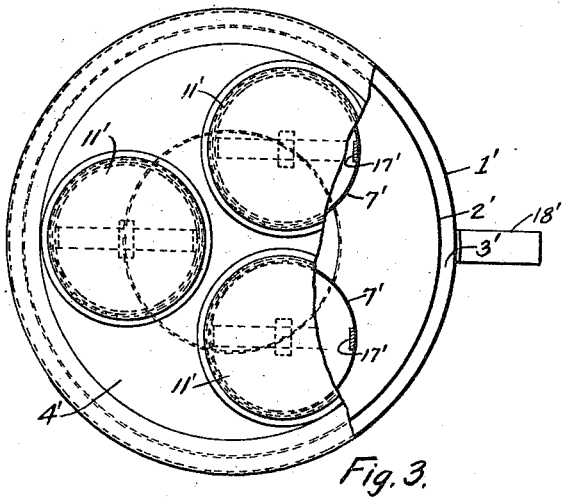
Figure 6:
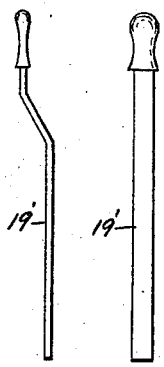
Figure 4:
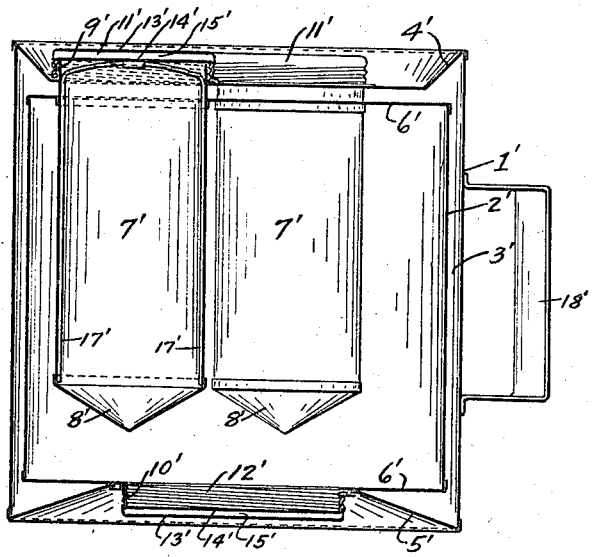

Figure 1 is a plan view of a freezer which is constructed in accordance with those principles, and is shown standing on end as in freezing. In this view a part of the freezer is removed to shown construction, and a key is added. Fig. 2 is a central vertical section of the same freezer. Fig. 3 is a plan of the freezer in a modified form. Fig. 4 is a central vertical section of Fig. 3. Figs. 5 and 6 are details.

In Figs. 1 and 2 the outer wall of the outer cylinder is designated by the numeral 1, while the co-axial inner wall of the same is designated by the numeral 2. These walls are separated by an annular air space 3 for the purpose of thermic insulation. The head of this outer cylinder has the shape of a frustum of a cone 4, while the bottom, or opposite head 5 of the same cylinder is of the same shape, but in an inverted position. The top and bottom of the inner wall 2 of the outer cylinder are flat annular plates 6, which are united with that wall at their peripheries, and are also united with the heads 4 and 5 respectively at the inner margin of said heads and plates. The hole through the middle of head 6 is occupied by the internal cylinder 7, which reaches in beyond the middle of the external cylinder, and ends in pointed conical form at the bottom 8. The same cylinder 7 extends up through the annular top 6 into the concavity of head 4, where it is encircled by a screw flange 9. Similarly the opening through the annular bottom 6 is bordered by a circular flange 10, which is located within the concavity of the reëntrant bottom 5, and has an external screw thread. These screw flanges, or mouths, 9 and 10, have screw caps, 11 and 12 respectively. The outer end of each of these screw caps is made double for heat insulation, and comprises an outer plate 13, a connected inner plate 14, and an intermediate air chamber 15. To the middle of the inner face 14 of screw cap 11 is firmly fastened a U-shaped scraper 17, which is elastic, and has spring arms, pressing outward against the inside of the cream cylinder 7. The freezer is provided with a handle 18 at one side; while the screw caps are provided with a removable key or lever 19, which may be inserted between the inner and outer faces of those caps in holes through that portion of said caps which unites said faces, as illustrated in Figs. 1 and 2.

That modification of my invention which is shown in Figs. 3 and 4, differs from the freezer which is already described, merely in the proportions of the parts, and in the number of the cream chambers. The numerals employed on Figs. 1 and 2, are applied with exponential primes to the corresponding parts of this modification.

Such being the construction of my improver freezer, its use and operation accomplish the above stated objects of the invention. The frezing and freezable mixtures are separated from each other beyond all danger of commingling, by locating the mouths of their respective compartments at opposite ends of the freezer. In the operation of charging the freezer, the proper distribution of the freezing mixture around the cream cylinder, is effected by the aid of the conical end 8 of the inverted cream cylinder, which sheds that mixture on all sides, as it is poured in through mouth 10. The contents of the freezer are thermically insulated by double walls at all points, and by intermediate air chambers 3 and 15. By the use of handle 18, the freezer is conveniently inverted, and made to stand first on one end and then on the other while the freezing is in progress; but without injuring or wearing the screw caps 11 and 12, which are wholly within the concavity of the reentrant heads of the outer cylinder. The turning of the screw cap on the mouth of the cream chamber not only opens that chamber but also simultaneously operates the attached spring scraper and thereby loosens the frozen cream.

Such being the construction and operation of my invention, I claim—

1. An icecream freezer, comprising a cream cylinder, which has a screw-threaded mouth, a screw cap for said mouth, and a rotary scraper, which is fastened to the inside of said cap, and works in unison therewith.

2. An icecream freezer, comprising a cream cylinder, which has a co-axial screw-threaded mouth, a screw cover for closing said mouth, a spring scraper, which is fastened to the inside of said cover, and rotates in said cylinder, when said screw cover is turned.

3. An icecream freezer, comprising an external double-walled cylinder having externally concave double-walled heads, projecting screw-threaded mouths in said double-walled heads, and double-walled screw caps, closing said projecting mouths within the concavities of said externally concave double-walled heads.

4. An icecream freezer, comprising a cream cylinder, which has a screw-threaded mouth, a screw cap for said mouth, and an elastic scraper, which rotates in unison with said screw cap.

5. An icecream freezer, comprising an external double-walled cylinder having externally concave double-walled heads, an outwardly projecting screw mouth through one of said externally concave double-walled heads, an internal cylinder having a screw mouth projecting through the other of said externally concave double-walled heads, and double-walled screw caps covering said projecting mouths within the external concavities of said externally concave double-walled heads respectively.

6. An icecream freezer, comprising a cream cylinder, which has a screw mouth, a screw cap for opening and closing said screw mouth, a heat insulating chamber, formed in said screw cap, and a rotary spring scraper, fastened to the inside of said screw cap.

In testimony whereof I hereunto subscribe my name in the presence of two witnesses.

WILLIAM B. McCANN.

Witnesses:
 WILLARD EDDY,
 THOS. F. PAYTON.